Dec. 6, 1955  C. W. VOGT  2,725,798
APPARATUS FOR AND METHOD OF ASSEMBLING ENWRAPMENTS
Filed Aug. 19, 1948  3 Sheets-Sheet 1
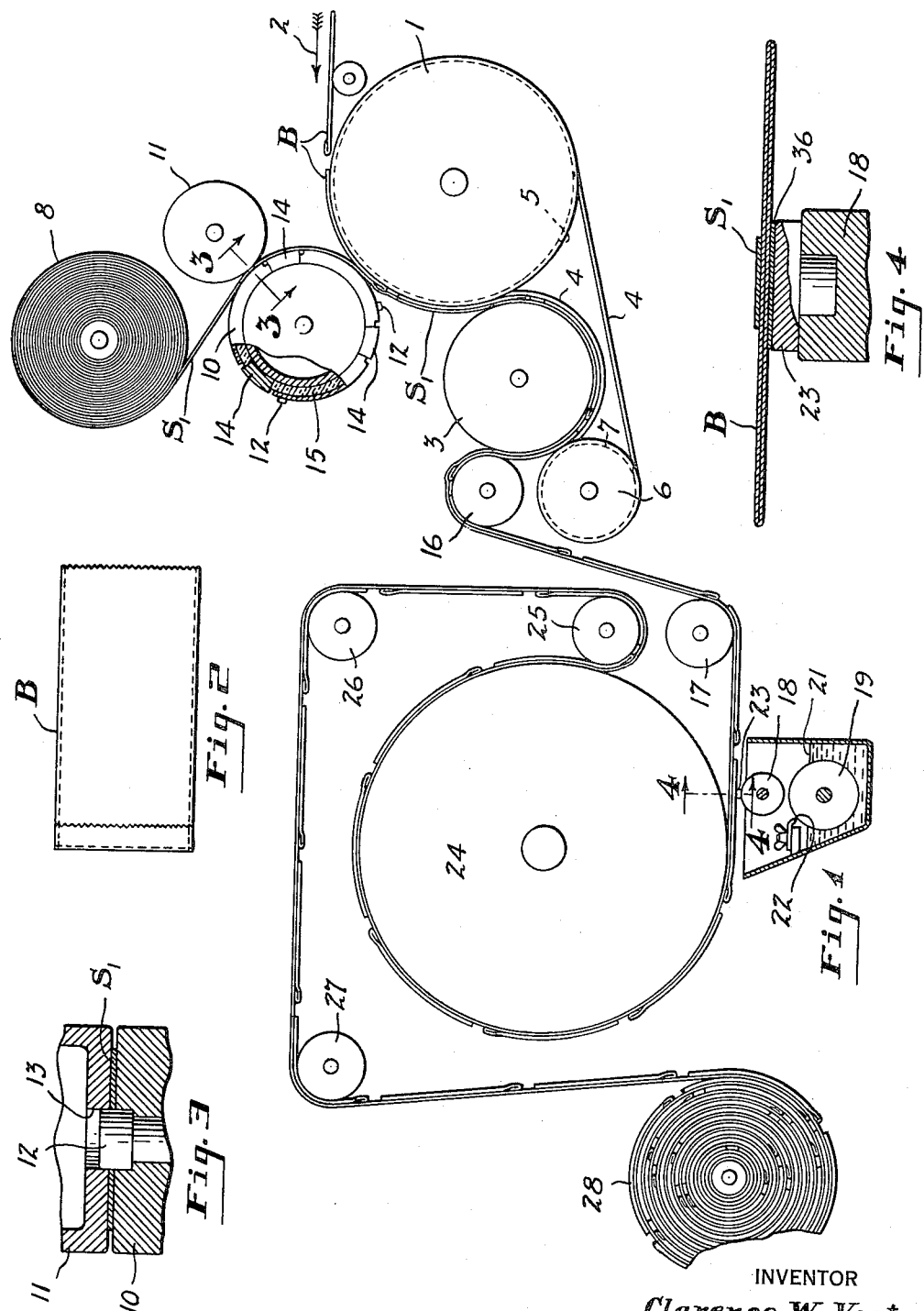
INVENTOR
*Clarence W. Vogt*
BY
*Evans & McCoy*
ATTORNEYS

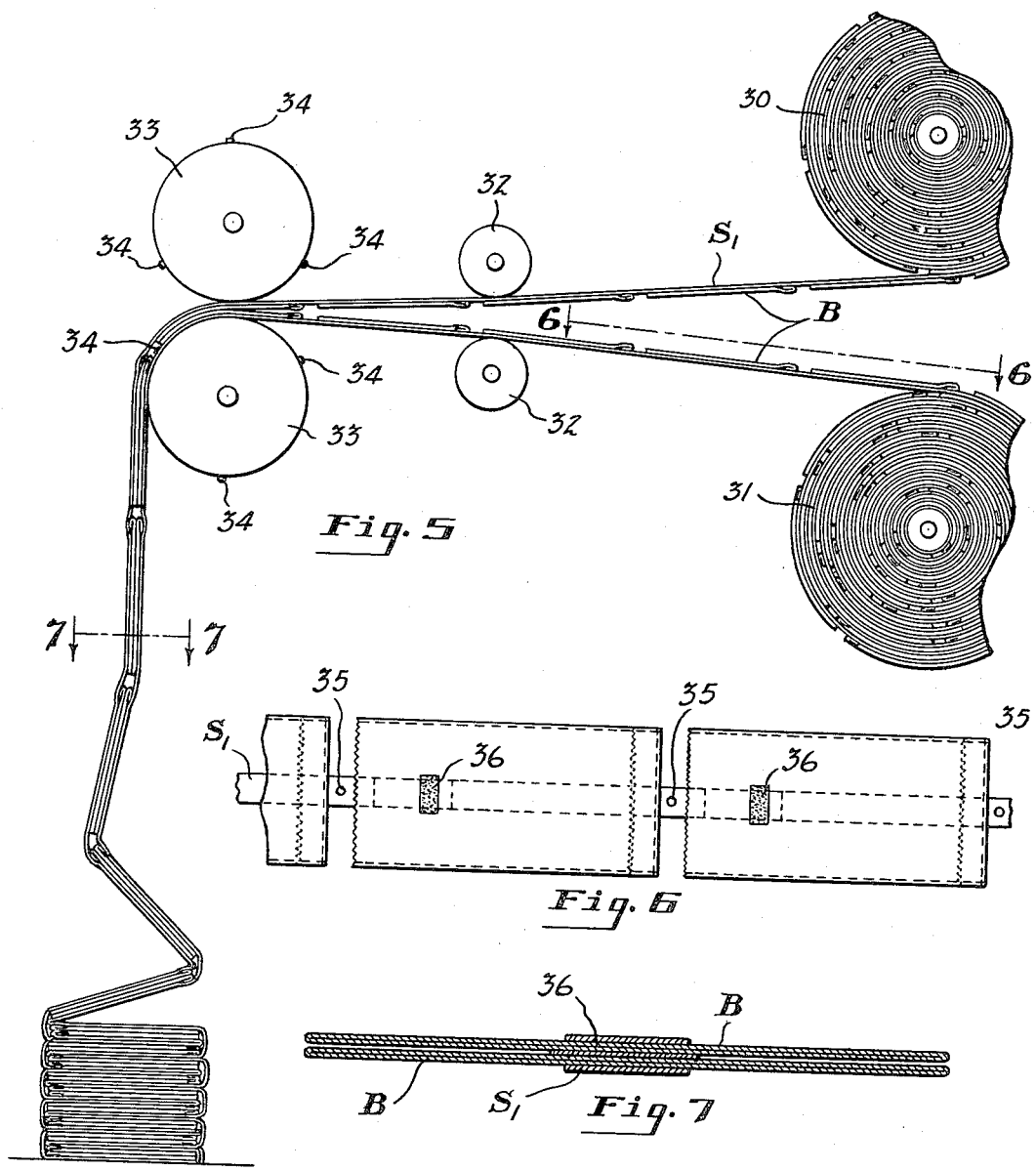

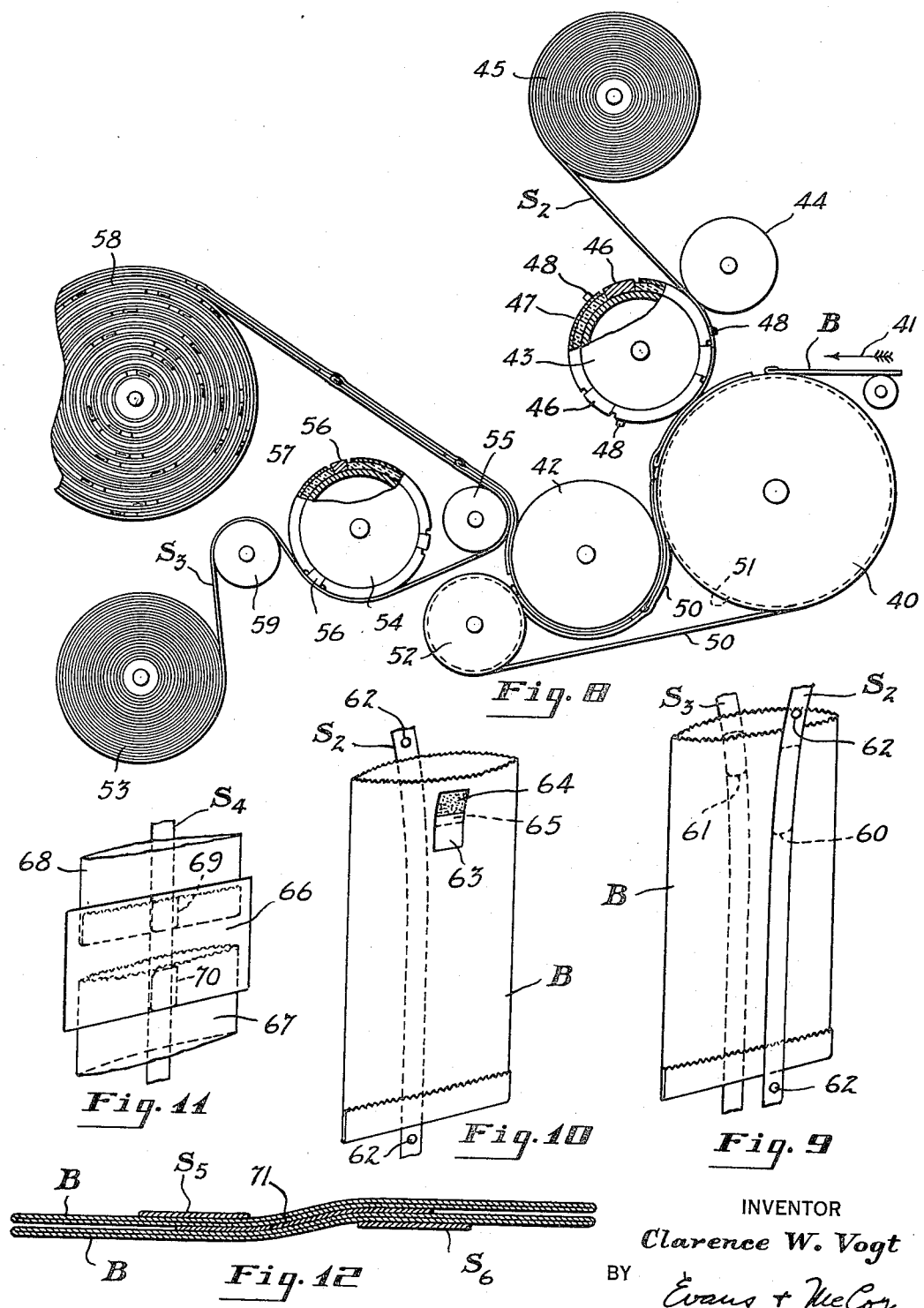

United States Patent Office 2,725,798
Patented Dec. 6, 1955

2,725,798

APPARATUS FOR AND METHOD OF ASSEMBLING ENWRAPMENTS

Clarence W. Vogt, Norwalk, Conn.

Application August 19, 1948, Serial No. 45,037

10 Claims. (Cl. 93—1)

This invention relates to the manufacture of enwrapments and in particular to a method of and apparatus for manufacturing flexible enclosures or enwrapments such as bags disposed in a series or chain suitable for use in the packaging of various materials which may be in a solid, liquid, or plastic state at the time of packaging.

It is an object of the present invention to provide a method of and apparatus for manufacturing enwrapments by which enwrapments such as bags made on present commercial bag-making machines may be assembled in a series or chain with individual bags disposed in end to end spaced relationship whereby they may be advanced successively through automatic packaging machinery for filling, closing, sealing, etc.

Another object is to provide a method of and apparatus for assembling bags into a series or chain such that the bags may be continuously fed with their mouth ends first to the filling nozzles of present day packaging machinery with little, if any, modification of the filling and sealing equipment required to permit handling of the series or chain of bags produced by the present invention.

A further object is to provide a method of an apparatus for manufacturing enwrapments in which a plurality of bags may be assembled into a series, individual units of which are disposed in longitudinal spaced relationship and such individual units are connected by an elongated strip material.

A still further object is to provide a method of and apparatus for manufacturing tubular enwrapments in which a series of individual bags are disposed in spaced longitudinal arrangement with an elongated strip material connected to one side face of each of the bags in said series and the opposite side face of each of the bags in the series are provided with handling elements to permit handling of the bags during filling and sealing thereof by automatic machinery.

Another object of the present invention is to provide a method of and apparatus for manufacturing enwrapments in which individual enwrapments are assembled into a series and are held in the series by temporarily connected elements useful in facilitating handling of the enwrapments to the filling or closing or sealing equipment, and which may be readily removed from the enwrapments after they have served their purpose.

A further object of the present invention is to provide a method of and apparatus for assembling a series of preformed enwrapments such as bags to form a series of pairs of bags, each pair of which is secured together with elongated strip material connecting the pairs into a series.

Other objects and advantages will become apparent from the following detailed description accompanied by the drawings in which:

Figure 1 is a semi-digrammatic elevational view of one form of apparatus which may be used to carry out the present invention;

Fig. 2 is an enlarged plan view of a bag of a type which may be readily made on a conventional bag forming machine and which may be used in carrying out the present invention;

Fig. 3 is a further enlarged fragmentary detail of a portion of the apparatus taken substantially on line 3—3 of Fig. 1;

Fig. 4 is an enlarged fragmentary sectional view taken substantially on line 4—4 of Fig. 1;

Fig. 5 is another semi-diagrammatic side elevation of an additional mechanism useful in carrying out the present invention;

Fig. 6 is an enlarged plan view of a portion of a series or chain of tubular enwrapments which may be made by the apparatus shown in Figs. 1, 3, 4 and 5;

Fig. 7 is an enlarged sectional view of a portion of the chain shown in Fig. 6 taken substantially on line 7—7 of Fig. 5;

Fig. 8 is a semi-diagrammatic elevational view of a slightly modified form of apparatus which may be used to carry out the present invention;

Fig. 9 is an enlarged perspective view of a portion of the article which may be produced by the apparatus shown in Fig. 8;

Fig. 10 is another enlarged perspective view of a portion of a further modified series of enwrapments made in accordance with the present invention;

Fig. 11 is a fragmentary perspective view of another modified form of a series of enwrapments made in accordance with the present invention, showing a series or chain somewhat similar to that shown in Fig. 10; and Fig. 12 is an enlarged sectional view through a pair of bags assembled into another modified form of chain, which is a variation of the chains shown in Figs. 6 and 7.

Briefly the present invention comprises the feeding of preformed tubular enwrapments, such as bags, of any shape, size or configuration, in a spaced series in which individual bags are disposed longitudinally with their tubular axes substantially parallel or in alignment. The bags thus fed are connected at intervals to an elongated strip material which is secured to a side panel of each bag in the series and thereafter the series of bags may be handled by the elongated strip material. If desired additional securing means may be provided on another section or panel of each of the iindividual bags to facilitate handling theerof during feeding of the bags into automatic packaging machinery where they may be opened, filled, closed, sealed, labeled, etc.

Fig. 1 illustrates the feeding of a series of bags B which may be fed to a drum or roller 1 in the direction of the arrow indicated by the numeral 2. The bags B pass partially around the periphery of the roller 1 and thence are transferred to an adjacent roll 3. To facilitate transfer of the bags from the drum 1 to the drum 3 and to retain the bags on the periphery of the drum 3 an endless belt or tape 4 may be provided. The belt 4 may ride in a centrally located recess 5 in the periphery of the drum 1 so that its bag contacting surface may be flush with the periphery of the drum 1. To complete its endless path the belt 4 travels around a pulley 6 disposed oppositely of the roll 3 from the drum 1, thus causing a free run of the belt 4 to travel around and retain the bags on the external periphery of the drum 3. The pulley 6 may also be provided with a recess 7 in its periphery to accommodate the belt 4. After passing around the drum 1, roll 3 and the pulley 6 the endless belt 4 returns to the drum 1.

As the bags or enwrapments pass around the periphery of the drum 1 elongated strip material may be fed thereagainst and the bags secured to such strip material. For example, a supply roll 8 may be mounted for rotation in the region of the drum 1 and a strip or tape S–1 of elongated material withdrawn therefrom by a pair of feed rolls 10 and 11. The feed rolls 10 and 11 may be driven in any suitable manner not shown, in opposite directions with their peripheries in engagement at any desired surface pressure which is preferably variable to permit adjustment for the various types of strips which may be used. If desired the feed rolls 10 and 11 may be covered with rubber or other suitable composition to increase their frictional grip with the tape S–1.

Further, the feed roll 10 may be provided with a plurality of punch elements 12 at spaced points about its periphery which punch elements 12 may be received in apertures 13 in the feed roll 11 to perforate or otherwise provide the elongated strip material S–1 with registry indicia. The use of perforations, slits or other registry indicia permits accurate registering of the strip material S–1 during subsequent handling thereof.

The feed roll 10 applies the strip material S–1 to the surface of the bags as they travel around the periphery of the drum 1 and the strip material may be secured to the bags in any desired manner. For example, the bags B may be connected to the strip or tape S–1 by stapling; by adherence with a water-soluble paste or glue, a pressure sensitive adhesive, a thermosetting or thermoplastic adhesive; or in any other suitable manner. It is believed preferable for most applications to utilize a strip material having adhesive areas therealong so that portions of the bags are adhered thereto.

An extremely satisfactory connection for the series of bags is an elongated strip material having a coating thereon of a suitable thermoplastic adhesive so that when the strip material is heated the thermoplastic adhesive will become activated and after it is applied to the bags the strip material will be securely adhered to a side panel or section of the bag. The activation of the thermoplastic adhesive material may be accomplished in many ways but it is believed preferable to utilize heat transmitting sections or segments on the periphery of the feed roll 10 to heat the adhesively coated strip material as it passes over the feed roll.

The heating of spaced sections of the feed roll may be obtained by providing alternate sections of the periphery of the feed rolls of insulating material and heat transmitting material. The central portion of the feed roll may be hollow and carry therein a suitable heat transfer medium such as hot oil. Also, segments of the feed roll may be heated by the use of heating elements having a relatively high resistance to the flow of electricity therethrough.

The numeral 14 indicates the heat transmitting sections of the feed roll 10 and the numeral 15 indicates the insulated sections thereof. Thus, as the strip material S–1 passes through the feed rolls 10 and 11 and partly around the roll 11, the portions thereof having a heat activatable adhesive thereon are heated to a tacky condition so that when applied to a side section of a bag the elongated strip material will firmly adhere thereto. With the roll 3 in close engagement with the drum or roller 1 the assembled elongated strip material S–1 and bags B may pass therethrough and be pressed by such rolls to insure good contact and adherence of the bag material and elongated strip. It is desirable to provide for adjustment of the roll 3 or the feed roll 10 with respect to the drum 1 so that the strip S–1 may be applied to the bags with the proper amount of pressure to insure an adequately secure connection therebetween. This pressure will vary according to the characteristics of the adhesive employed and also according to the material from which the bags have been formed.

After leaving the drum or roller 3, the assembled bags and elongated strip material may be fed around idler rolls 16 and 17 and thence past an adhesive applying roll 18. The adhesive applying roll 18 may be mounted for rotation in a container 19 which also carries a roll 20 partially immersed in a suitable adhesive indicated by the numeral 21. Roll 20 rotates past an adjustable doctor blade 22 which controls the thickness of the film of adhesive withdrawn from the bath by the roll 20. The adhesive applying roll 18 is provided with a button or projection 23 which engages the exterior surface of the roll 20 and receives a supply of adhesive material during each rotation of the rolls 18 and 20. As the button 23 rotates upwardly into engagement with a bag passing over the container 19 it applies a dab or area of adhesive material thereto (see particularly Fig. 4). The adhesive material 21 contained in the container 19 may be of any suitable type. It is preferable to utilize one of the various adhesives known in the trade as a self-sticking type which only adheres to another area of the same substance. An example of such an adhesive is called "No. 110" which is supplied by the General Adhesive and Chemical Company.

After leaving the projection 23 of the roller 18 the elongated strip material and bags may travel around a drying drum 24 if it be necessary to dry the adhesive material applied by the roller 18. The drying drum 24 may be heated in any desired manner (not shown), such as by passing steam through a hollow chamber therein to facilitate drying of the adhesive. If desired, the elongated strip material and bags could be passed through a tunnel having heat lamps, resistance heaters, ultra violet lamps or the like.

The assembled bags and strip material may pass around the periphery of the drying drum 24 for sufficient distance to permit drying of the adhesive and then travel over driven or idler rolls 25, 26, and 27 and thence may be reeled into a roll as indicated by numeral 28.

The roll of material resulting from the apparatus shown in Fig. 1 comprises a series of bags secured at spaced intervals to an elongated strip material and having an opposite face of each bag provided with a dab of adhesive material. This dab of adhesive material may be utilized to secure to the series or chain of enwrapments an additional handling means so that it is possible to control two opposite sides of the bag while it is being fed to automatic packaging machinery. For example, it may be desired to control the bags to separate their opposite faces and open the mouths of the bags to permit the reception of a filling nozzle within the bag.

If desired the series of bags connected at intervals to the elongated strip material S–1 may be utilized without the addition of an additional handling element or means facilitated by the application of the adhesive area by the roll 18 and the projection 23 thereon. The elongated strip material S–1 can be utilized to feed the series of bags to their filling position and the opposite panel of the bag may be controlled for opening or other purposes by the use of a vacuum cup. Also, the series of bags may be fed by the elongated strip material S–1, leaving the opposite panel of the bag unsupported and the bags may be opened by a blast or jet of air emanating from the region of the filling nozzle to force the bag open.

Control of a series of bags may also be accomplished by connecting a pair of bags together and securing elongated strip material to the outer faces or sides of each connected pair of bags. One mechanism for accomplishing this is illustrated in Fig. 5 in which two of the series or chains produced as shown in Fig. 1 may be assembled and connected together. The two chains may be positioned adjacent each other and pressure applied to cause adherence of the dabs of self-sticking adhesive provided on the faces of the bags opposed from those faces which are secured to the elongated strip materials.

In Fig. 5 the numerals 30 and 31 represent a pair of rolls of chained bags such as are illustrated by the numeral 28 in Fig. 1. These rolls are mounted on spaced shafts and webs of the two chains are withdrawn therefrom and led between a pair of spaced idler rolls 32 and a pair of feed rolls 33. The two webs are fed so that the dabs of adhesive disposed on the bags face each other and the feed rolls 33 may be provided with projections 34 to register with the perforations 35 previously formed in the tape S-1 by the punch elements 12 to permit accurate registry of the two chains. The purpose of the spaced idler rolls 32 is to insure that regardless of the size of the rolls 30 and 31, which will vary as the webs are withdrawn therefrom, the two webs will approach each other in a constant angular path going into and between the feed rolls 33.

Preferably the feed rolls 33 are adjustable toward each other to permit the application of pressure to the pair of bags thus insuring that the bags of each chain will be secured together. After passage through the feed rolls 33 the pair of assembled chains may be placed in condition for storage, sale or further use by rolling, stacking or manifolding. Fig. 5 shows the completed chains traveling downwardly from the rolls 33 to a stacked or manifolded position. Figs. 6 and 7 indicate the chained enwrapments thus formed and from which it may be seen that a series of pairs of bags are provided with the bags of each pair securely adhered together by their dabs of adhesive material indicated by the numeral 36. Each pair of bags also has secured thereto a pair of elongated strips which are connected to the outwardly or oppositely directed faces of each pair of bags. If the adhesive dabs 36 are disposed in the region of the mouth ends of the bags separation of the elongated strips will cause both of the bag mouths of each pair of bags to open to allow simultaneous filling of the bags in each pair. Instead of first forming the rolls 30 and 31 separately, it is obvious that one or both of them may be supplanted by the apparatus of Figure 1, so that the two series of tapes and bags S-1 may be formed and, in a continuous operation, joined as shown in Fig. 5.

Fig. 8 discloses apparatus for making a slightly modified chain or series of enwrapments from that made on the apparatus shown in Fig. 1. The chain made by the mehanism illustrated in Fig. 8 comprises a series of spaced bags in longitudinal relation disposed between and secured to a pair of elongated strips, each of which is connected to a side face of each of said bags. To carry this out the adhesive applying container and rolls of Fig. 1 are replaced by a feed mechanism to feed and apply an elongated tape or strip and secure it to each of the bags in the series.

In a manner similar to that shown in Fig. 1, completely formed bags or enwrapments are fed to a drum 40 in the direction of the arrow indicated by the numeral 41. The bags thus fed pass around the periphery of the drum 40 and are transferred to the periphery of a roller 42. A feed roll 43 is positioned adjacent the drum 40 and feeds with the assistance of feed roll 44 elongated strip material S-2 which is withdrawn by the feed rolls from a supply roll 45. The feed roll 43 similar to the feed roll 10 shown in Fig. 1, is provided with heated portions or sections 46 with intervening insulated portions 47 to activate a thermoplastic adhesive material disposed on the surface of the elongated strip S-2. Feed roll 43 may also be provided with punches 48 which in cooperation with apertures in feed roll 44 provide registry indicia on the elongated strip material S-2.

The feed rolls 43 and 44 withdraw the elongated strip material from the supply roll 45 and feed it to a position adjacent the path of the series of bags passing around the periphery of the drum 40 and the adhesive areas on the elongated strip activated by the feed roll 43 will adhere to each of the bags securing them to the elongated strip material. The pressure which may be afforded between the feed roll 43 and the drum 40 will facilitate secure adherence of the bags and strip material. Similar to the construction shown in Fig. 1 the drum 40 may be provided with a centrally disposed endless belt 50 which may be mounted in a recess 51 in the periphery of the drum 40 so that the belt will be flush with the periphery of the drum.

The belt 50 travels around the periphery of the drum 40 and around the periphery of a pulley 52 which may be disposed on the opposite side of the roll 42 from the drum 40. Thus one run of the belt 50 extends adjacent to the periphery of the roll 42 and serves to retain the assembled bags and elongated strip material against the periphery of this roll. Belt 50 also insures proper transfer of the bags from the drum 40 to the roll 42.

As the assembled bags and elongated strip S-2 pass around the periphery of the roll 42 a second length of elongated strip material S-3 may be applied to an opposite face or panel of the series of bags. A supply roll 53 of elongated strip material may be provided and feed roll 54 may withdraw strip material from the supply roll over an idler roll 59 and apply the same to the series of bags passing around the roll 42 with the assistance of a pressure roll 55. The feed roll 54 may be provided with heated sections 56 and intervening insulated sections 57 to activate a coating of thermoplastic adhesive material on the elongated strip S-3. The pressure roll 55 applies the elongated strip S-3 to the bags and may be mounted so that it presses against the roll 42 sufficiently to insure secure adherence of the strip material to the series of spaced bags. After leaving the roll 55 and the roll 42 the chain or series of bags, which now has connected thereto a pair of strips of elongated material on opposite faces of each of the bags, may be placed in condition for storage or further use. For example the chains or series may be wound on a reel into a roll such as is indicated by the numeral 58 in Fig. 8. The rolls of assembled chains may be sold as articles of commerce or transferred to automatic filling machinery for use in packaging.

Fig. 9 illustrates in perspective a portion of the chain or series produced by the apparatus shown in Fig. 8. The elongated strip material may be secured at any desired point or points to the bags. However, it is generally believed preferable that the connection between the strip and the bag be in the region of the mouth of the bag as indicated by the location of the adhesive area identified by the numeral 60 and connecting strip S-2 with a bag (Fig. 9). The connection between the strip S-3 and the bag may be the same as or different from the connection of the strip S-2 and the bag. For example the numeral 61 illustrates the adhesive area on the strip S-3 to which the bag is connected and it may be seen that it is of smaller extent than the adhesive area 60. Similar to the strip S-1 in Figs. 6 and 7, the strip S-2 is shown as provided with perforations 62 for the purpose of assuring accuracy in registry of the individual bags in the chain or series when the chain is handled. It will be obvious that if desired either of the strips S-2 or S-3 or both may be provided with such registry indicia.

As shown in Fig. 9 the elongated strips S-2 and S-3 have been applied at spaced points so that they are transversely offset and not superposed. This may be done to facilitate rolling of the assembled chain since the strips if superposed may cause a bulkiness at this point. More important than the bulkiness, however, is the fact that if the strips are superposed and the resulting chain rolled to a cylinder of relatively large diameter, the fact that the strips S-2 and S-3 are of uniform length will cause trouble in rolling. The innermost of these strips, when rolled, will be loose whereas the outermost of the strips will be under tension and in a large roll would tend to tear itself or the bags or cause other difficulties. The difference in length between the strips when rolled is due to the thickness of the bag disposed therebtween, and if the tabs are offset and not superposed, they may adjust themselves so that when rolled they may both follow paths which are substantially the same radial distance from the center of the roll at any given point. It will be obvious that the locations of the strips S-2 and S-3 with respect to the bag may be varied according to the manner in which the completed chain will be utilized.

Fig. 10 illustrates a portion of a modified form of chain which may be fabricated by apparatus substantially similar to that shown in Fig. 8. The mechanism used in Fig. 8 to feed the elongated strip S-3 may be replaced by a conventional labeling machine which feeds and severs labels or tabs from a supply roll of connected labels or tabs, intermittently applying the severed labels or tabs individually. This results in a chain having an elongated strip S-2 applied to one face of the bags and on the other face a handling element such as a tab 63 may be secured to the bags. The tab 63 is preferably provided with a flange portion 64. When the tab 63 is provided with a flange 64 it is believed desirable not to utilize adhesive material on the surface thereof facing the bag, so that flange 64 does not adhere to the bag. This flange portion may thus be available when the chain of bags is being fed to packaging machinery to be contacted by suitable mechanism which will grip the flange 64 to control the bag, such as for opening the mouth of the bag or for moving the bag through the filling and sealing mechanism or both.

It is also contemplated that the exterior surface of the flange 64, which faces away from the bag, may be provided with an adhesive material of any suitable type to facilitate the gripping of the tab by a portion of the packaging mechanism or to secure the bag and tab to another bag and tab, thus forming a chain similar to that shown in Figs. 6 and 7 comprising pairs of bags. If desired, the adhesives used on the inside of the tab 63 and the outside of the flange 64 may have different characteristics and preferably an uncoated marginal portion 65 is provided therebetween. For example, the adhesive on the tab may be a thermoplastic adhesive while that on the flange is not heat activatable so that activating the adhesive on the tab to adhere it to the bag will not affect the adhesive on the flange. The flange 64 may extend in any desired direction from the tab 63 or a plurality of flange portions may be utilized, depending upon how it is desired to grip the bag.

Obviously it may be desired to remove the elongated strip material or the tabs from the enwrapments when they have been filled and sealed. When a suitable thermoplastic adhesive material is utilized to connect the strip material to the bags this may be done by reheating the adhesive material and then peeling the elongated strip or tab from the bag. In other circumstances it may be desired to leave the tabs or strip material connected to the package for labeling it or to act as a sealing and reinforcing strip or to assist in the display or dispensing of the package.

It is also believed desirable to use a thermoplastic adhesive which has what might be termed "delayed action." This means that after the adhesive material has been activated by heat and becomes tacky it will retain its tackiness for an appreciable time even though the elongated strip and adhesive material have time to cool before being applied. Accordingly, it is not always necessary to press the elongated strip material to the bag immediately after heating the strip to activate the adhesive. This is of particular advantage in the case where the sheet material from which the bag is made has a relatively low melting point. When such a material is used the activation of the tape might cause fusing of adjacent portions of the bag or impair the bag if it were necessary to heat the tape and simultaneously apply and press it to the bag. However, it is generally believed best to apply and press the strip material as soon after the adhesive material thereon has been activated as is practicable.

Fig. 11 illustrates a chain or series of enwrapments similar to Fig. 10. In this chain the handling element on one face of the bag may be a tab or label which comprises a section of sheet material 66. It may be noted that the handling element is in addition a chaining element and is applied to the series of enwrapments being secured adjacent the mouth end of one bag, a portion of which is indicated by numeral 67. The sheet material 66 is also secured to the adjacent end of the next bag in the series. Thus the bags are chained but less material is required than in a case where strip material extends for the full distance of the series of bags. The numeral 68 indicates the bottom portion of the next adjacent bag and the section 66 may be permanently or detachably secured thereto. The opposite faces or panels of the bags in the chain may be secured to an elongated strip material S-4. If desired the chain may be constructed without the use of an elongated strip material. In this event the chain may be forwarded since the sections 66 connect adjacent bags of the chain. Portions of individual bags may be controlled or handled by the use of suitable mechanisms such as vacuum cups, air jets, etc. to open the bag mouths or perform other operations thereon. One purpose of providing a handling element such as the section 66 is to permit use of the section as a label or top enclosure when the bag has been filled. For example, by the use of suitable thermoplastic adhesive material the section 66 may be adhered to the bottom portion of the bag 68 along an adhesive area indicated by numeral 69. Also the section 66 may be adhered or otherwise secured to the bag 67 at a region near the mouth thereof, at an adhesive area indicated by numeral 70 in Fig. 11.

It will be noted that the adhesive area 70 may be spaced from the mouth end of the bag sufficiently to permit folding over the mouth end to provide a more secure top seal for the bag 67. Another desirable top seal for the bag may be provided by completely coating the section 66 with adhesive material and extending the label beyond the edge portions of the bag at the sides and the top so that when the label is folded over upon itself and sealed, the label will provide a sealed area completely surrounding the top and sides of the bag mouth thus providing a sift proof closure.

In use the chain may be fed by the elongated strip material S-4, which may have registry indicia therealong to provide for accurate register of the chain, and after the connection of the sheet material to the adjacent bag 68 has served its purpose, the adhesive area 69 may be heated and the section 66 removed from its connection with the bag 68.

After the bag 67 has been filled, the mouth end may be sealed by folding the section 66 over the top of the bag and securing it to the face of the bag opposite from the existing connection of the section 66 and the bag 67, indicated by the adhesive area 70. At the same time the strip S-4 may also be removed, if this be desired, or it may remain connected to the bag 67 for use in further handling or displaying the filled and sealed bag. Obviously, the section 66 may extend across the full width of the bags and may be printed with trademarks, advertising material, etc. so that it may serve as a label for the package or it may be narrower than the bag and act as a closure strip.

The chain or series of enwrapments shown in Fig. 11 may be made on the apparatus shown in Fig. 8, changed by replacing the mechanism for feeding and applying the strip material S-2 with an attachment similar to a present commercial label applying machine to feed, sever and apply the sections 66 to the series of bags at a point where it can be applied and secured to the end portions of adjacent bags in the series.

Fig. 12 discloses a modified form of chain in which pairs of bags are connected together and secured to a pair of elongated strips which are disposed outwardly of each pair of bags. Such a chain is similar to that disclosed in Figs. 6 and 7. However, it will be noted that the elongated strips S-5 and S-6 are transversely offset with respect to the center lines of the superposed bags B which are connected into a pair by adhesive material indicated by the numeral 71.

This chain may be readily made by the apparatus shown in Figs. 1, 3, 4, and 5, except that the feed rolls 10 and 11 which apply the elongated strip material in Fig. 1 will be offset with respect to the center line of the bags. Also the projection 23 of the adhesive applying roll 18 may be of substantially greater width to produce the adhesive area 71 which may be applied centrally with respect to the center line of the bags B.

Thus the completely assembled chain which leaves the rolls 33 may be wound into a roll without difficulty. As illustrated in Fig. 12 the offsetting of the strips S–5 and S–6 will permit the portion of the bags between them to curve so that the strips S–5 and S–6 may be disposed the same radial distance from the center of the roll at any given point in the roll. The curvature of the bags between strips S–5 and S–6 may be accomplished in any suitable manner. For example, the reel on which the chain is wound may be formed to cause the first layer of material to conform in cross section to the outline shown in Fig. 12.

A similar result may also be accomplished by applying the elongated strips at the center line of the bags as disclosed in Fig. 7 and transversely offsetting (with respect to the center line of the bag) the projection 23 of the adhesive applying roller 18 to obtain a transversely offset adhesive area. Then the two webs of assembled bags and strips may be transversely offset with respect to each other as they are joined when passing through the rolls 33 of Fig. 5 to produce a chain which may be reeled with the elongated strip able to remain at all times a substantially equal radial distance away from the center of the roll, similar to Fig. 12. In so doing, the bags in each pair will be transversely offset with respect to each other, which may be of advantage in conforming to the location of the filling nozzles of the packaging apparatus.

As an alternative form of chain it is also contemplated to connect together adjacent bags disposed in a series without the use of any handling elements or elongated strip material. This may be done by applying an adhesive material to one or both of two adjacent bags in a series, overlapping portions of the bags and obtaining adherence therebetween. For example, each of the bags could be provided on the portions to be overlapped with areas of self-stick adhesive. It is believed to be desirable to utilize a suitable thermoplastic adhesive for connecting the adjacent bags together so that the adhered portions may be reheated to more readily separate them when it is no longer desired to retain them in a chain or series.

One of the features of the present invention is the ease with which the mechanism for assembling the enwrapments and elongated strip materials may be applied to existing commercial bag-making machinery. For example, in Fig. 1 the drum 1 could be the bottom creasing drum of one type of conventional bag machine. At this location the bag has been formed and is being fed in spaced relation with the bottom of the bag in a leading position. The bottom seal has been made by folding over a portion of the tubing and where a liquid adhesive is utilized the adhesive has been applied. At the location of the drum 1 cooperative elements of the bag-making machine crease this bottom fold to make sure that there is good adherence and sealing of the bag bottom. From the bottom creasing drum the bags are transferred with the help of an endless belt or tape similar to the belt 4 to a forwarding roll which corresponds to the roll 3. The forwarding roll transfers the bags to a delivery drum which grasps the leading bottom end of the bag and deposits it in a stack. By merely removing the delivery drum from such a machine and adding the mechanism for applying the elongated strip, the mechanism shown in Figs. 1 or 8 may be readily provided in conjunction with the bag-making machine. The conversion of other conventional types of bag-making machines may also be accomplished since in such machines the bags when completed or substantially completed are being fed in a continuous spaced series and it is at this point that the mechanism of the present invention may be applied. In this way present bag manufacturers may incorporate apparatus embodying the present invention to manufacture a series or chain of bags which could be sold as an article of commerce.

It will be noted that in addition to the greater usefulness of the chain of bags for filling with automatic machinery due to the greatly decreased handling involved it would also be a great deal simpler and less expensive to ship unfilled bags when wound in a roll rather than boxing and shipping stacks of bags as is presently done. The provision of suitable cartons for shipping bags is an appreciable cost item to bag manufacturers.

It will also be noticed that in Figs. 1 and 8 the assembled chains or series of bags are rolled in the same direction as the bags are forwarded from the bag-making machine, that is, bottom first so that when unrolled these chains will be fed mouth first which would be the desired position for feeding to automatic packaging machinery.

The elongated strips for use in the present invention may be made of any suitable material provided they have sufficient strength to permit feeding of the bags thereby and do not have sufficient elongation to adversely affect the length of the strip or the spacing of the bags connected thereto. When adhesive materials are used to secure the bags to the strip material it will be understood that the surface of the strip material may be entirely coated with adhesive in which case only the regions which are to be used to secure bags thereto need be activated to a tacky condition. To save the expense of the adhesive material used in completely coating the strip, it may be preferable to coat only in the areas which are desired for use in adhering the bags to the strip. Further, since it is necessary to handle this strip material in applying the spaced adhesive areas thereto, it may also be desirable to provide the strip with registry indicia at the same time. This would eliminate the need for the punch members 12 and 48 disposed on the feed rolls 10 and 43 in Figs. 1 and 8 respectively, although they may still be of value in obtaining accurate registry during feeding of the strip material to be assembled with the bags. It is also believed that the use of a tape which has been previously processed to provide the spaced adhesive areas and the registry indicia woul lend itself advantageously to combining the present apparatus with high speed bag-making machinery.

While Fig. 2 shows a bag which comprises tubing having an end closed to form a bag, it will be understood that various other types of bags can be utilized in conjunction with the present invention. It is contemplated that bags having infolds or pleats along their side edges may be advantageously combined into chains or series as well as laminated bags and bags of other designs or construction. Also the bags may be of the type having areas of thermoplastic or other suitable adhesive material on the interior of their mouth portions to facilitate sealing such mouth portions. New progress in the making of sheet materials is making available bags or enwrapments composed of a large variety of substances which may be utilized in carrying out the present invention in addition to the great variety of substances which are already used in the making of bags and similar enclosures.

It will be understood that the foregoing description of preferred embodiments of the invention is for the purpose of explanation and illustration and numerous variations and modifications may be made without department from the spirit of the invention.

What I claim is:

1. The method of manufacturing enwrapments which comprises feeding a series of tubular enwrapments in a common path with all of the enwrapments lying with their axes in parallel relationship, feeding elongated strip material to one side of said series of tubular enwrapments, connecting said elongated strip material to said one side of each of the tubular enwrapments in said series in the region of an openable end portion thereof, and applying an adhesive to the outer side of each of said enwrapments in said series.

2. The method of manufacturing enwrapments which comprises feeding a series of flattened bags in a common path in the direction of their axes, feeding a tape to said common path, adhering said tape to one side of each of said bags in said series at a point transversely offset from the axis of said bags, feeding a second tape adjacent an opposite side of each of said bags, and offset with respect to the plane of the first tape, and connecting said tape to said opposite sides of each of said bags in said series.

3. The method of manufacturing enwrapments which comprises forming a series of bags disposed in parallel spaced relationship with each of said bags secured to an elongated strip, forming a second series of bags similar to said first series, superposing said series of bags with the elongated strips thereof disposed outwardly, and securing certain of the bags in one series to certain of the bags of the other series.

4. The method of manufacturing enwrapments which comprises feeding a series of tubular enwrapments in a common path in the direction of their axes, securing to each enwrapment in said series an elongated strip extending in the direction of the common path, securing a handling element to the opposite side of each of said enwrapments, and advancing said series by said elongated strip material.

5. The method of assembling a series of enwrapments which comprises adhering an elongated strip to one side face of each of a plurality of enwrapments disposed in spaced longitudinal relationship, adhering handling elements to the opposite face of each of said plurality of enwrapments, and rolling said assembled enwrapments and elongated strip into a roll.

6. The method of assembling a series of enwrapments which comprises adhering an elongated strip to one side face of each of a plurality of enwrapments disposed in spaced longitudinal relationship, adhering handling elements to the opposite face of each of said plurality of enwrapments, and forming registry means in said elongated strip between adjacent enwrapments.

7. Apparatus for assembling a series of enwrapments which comprises a supporting surface, means to direct a series of spaced longitudinally disposed enwrapments over said surface, feed mechanism to advance elongated strip material into superposed position with respect to enwrapments on said supporting surface, means for successively securing one face of each of said enwrapments to said elongated strip, mechanism to advance said elongated strip and remove secured enwrapments from said supporting surface, and means to apply an adhesive to the opposite face of said enwrapments.

8. Apparatus for assembling a series of enwrapments which comprises a supporting surface, means to direct a series of spaced longitudinally disposed enwrapments over said surface, feed mechanism to advance elongated strip material into superposed position with respect to enwrapments on said supporting surface, means for successively securing one face of each of said enwrapments to said elongated strip, mechanism to advance said elongated strip and remove secured enwrapments from said supporting surface, and means for applying a handling element to the opposite face of each of said enwrapments.

9. Apparatus for assembling a series of enwrapments which comprises a supporting surface over which a series of spaced longitudinally disposed enwrapments may be advanced, feed mechanism to advance elongated strip material into superposed position with respect to enwrapments on said supporting surface, means for successively securing said enwrapments to said elongated strip, mechanism to advance said elongated strip and remove secured enwrapments from said supporting surface, an adhesive applying member to provide an opposite face of said enwrapment with an adhesive area, feed mechanism for advancing a second series of enwrapments secured at intervals to an elongated strip with said enwrapments having an adhesive area on an opposed face thereof into abutting relation with respect to said first series, and pressure members to adhere together the adhesive areas of the enwrapments of said two series.

10. Apparatus for manufacturing a series of connected enwrapments which comprises a supporting surface, means to direct a plurality of longitudinally disposed enwrapments over said surface, a supply roll of elongated strip material, feed rolls to advance the elongated strip material into superposed position with respect to openable mouth portions only of said enwrapments on said supporting surface, means for providing said elongated strip material at spaced intervals with registry means, means for securing enwrapments to said elongated strip between adjacent registry indicia, and means for advancing said elongated strip to remove it and the enwrapments secured thereto from said supporting surface.

References Cited in the file of this patent
UNITED STATES PATENTS

| 2,013,844 | Sherman | Sept. 10, 1935 |
| 2,028,341 | Masterson et al. | Jan. 21, 1936 |
| 2,259,878 | Clancy | Oct. 21, 1941 |
| 2,281,964 | Wolf | May 5, 1942 |
| 2,363,417 | Heywood | Nov. 21, 1944 |